Patented June 7, 1949

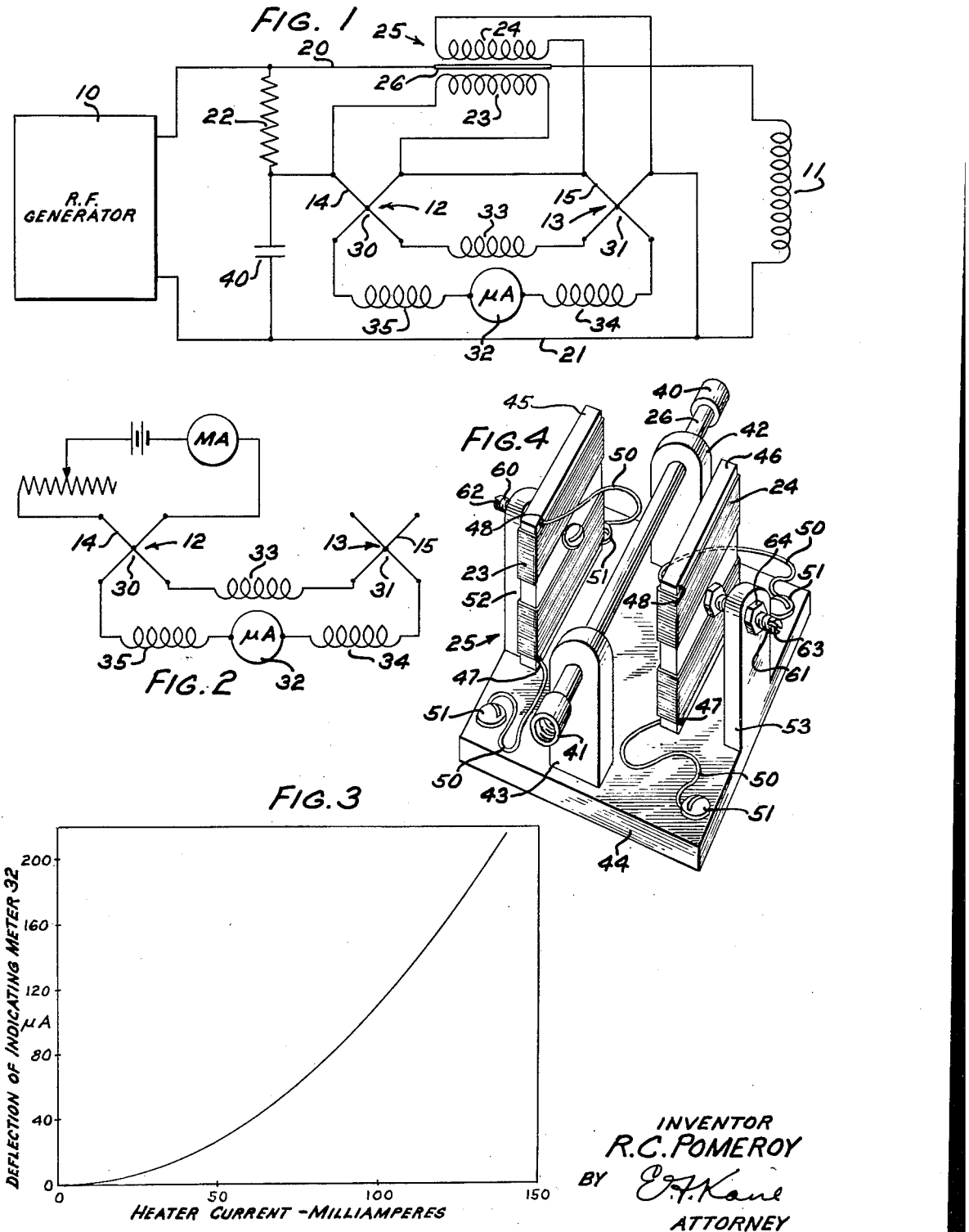

2,472,546

UNITED STATES PATENT OFFICE 2,472,546

ADJUSTABLE CURRENT TRANSFORMER

Richard C. Pomeroy, Westchester, Ill., assignor to Western Electric Company, Incorporated, New York, N. Y., a corporation of New York Application June 6, 1947, Serial No. 753,141

6 Claims. (Cl. 171—777)

This invention relates to electrical measuring apparatus and more particularly to radio frequency wattmeters.

An object of this invention is to provide a new and efficient apparatus to measure power delivered to a load at radio frequencies.

In accordance with one embodiment of this invention an apparatus for measuring radio frequency power utilizes a pair of matched uninsulated thermocouples with their bimetallic voltage junctions connected in series opposition and in series with a microammeter through radio frequency chokes. The heater of each thermocouple is connected to an independent secondary winding of a low-inductance dual current transformer having a common primary connected in series with the load and two identical but oppositely polarized secondary windings so that each heater will be supplied with a current of the same value but flowing in the opposite direction in each heater. In addition, the heaters are supplied with a current proportional to the load voltage by connecting the heaters in series with each other and with a noninductive resistor and connecting the series combination across the feed lines to the load. The resulting differential current in the output of the thermocouples is proportional to the power consumed by the load and actuates the microammeter to give an indication of the power.

A complete understanding of the invention will be had by referring to the following detailed description taken in conjunction with the accompanying drawing, in which Fig. 1 is a diagram of a preferred embodiment of the invention;

Fig. 2 is a diagram of a circuit used to determine the conversion constant of the thermocouple circuit;

Fig. 3 is a curve constructed from data obtained by the use of the circuit shown in Fig. 2; and Fig. 4 is a perspective view of a dual current transformer specially designed for use in the wattmeter circuit of the present invention.

As shown in the drawing the power measuring apparatus is connected between a radio frequency generator 10 and a load 11 and utilizes a pair of matched uninsulated thermocouples 12 and 13 whose heaters 14 and 15 are connected in series across feed lines 20 and 21 through a noninductive resistor 22 in order to supply the heaters with a current $I_1$ proportional to the load voltage. To provide the heater 14 with an independent current $I_2$ proportional to the load current and the heater 15 with an independent current $I_3$ proportional to the load current and equal to the current $I_2$, the heaters are connected to two independent and oppositely polarized secondary windings 23 and 24 of a dual current transformer 25, the primary 26 of which is connected in series with the feed line 20. There should be no effective mutual inductance between the secondary windings 23 and 24 which should have matched electrical characteristics in order that the current $I_2$ supplied by the secondary 23 to the heater 14 will be of the same value as the current $I_3$ supplied by the secondary 24 to the heater 15. Because of the opposite polarization of the secondary windings 23 and 24 the current $I_2$ in the heater 14 will be in the opposite direction to the current $I_3$ in the heater 15.

If it is assumed that the currents $I_1$ and $I_2$ flow in the same direction in the heater 14, then the currents $I_1$ and $I_3$ flow in opposite directions to each other in the heater 15 and, therefore, the resultant current $I_x$ in the heater 14 will be the vectorial sum of the current $I_1$ and $I_2$, and the resultant current $I_y$ in the heater 15 will be the vectorial difference of the currents $I_1$ and $I_3$. The degree of aiding or opposition will depend on the phase relationship between the current $I_1$ and the currents $I_2$ and $I_3$, and the thermocouples will be differentially heated responsive to power consumed in the load since the phase relationship between the current $I_1$ and the currents $I_2$ and $I_3$ is substantially the same as the phase angle between the load voltage and the load current.

Each of the bimetallic voltage junctions 30 and 31 of the thermocouples has a positive and a negative terminal, and the junctions are connected in series with each other and a microammeter 32 through radio frequency chokes 33, 34 and 35 in such a manner that the junction voltages oppose each other. This is effected by connecting one set of voltage junction terminals of similar polarity through the radio frequency choke 33 and by connecting the other terminals of the voltage junctions through the series combination of the radio frequency choke 35, the meter 32 and the radio frequency choke 34. The radio frequency chokes prevent thermocouple and meter burnouts by choking the flow of radio frequency currents which would otherwise circulate through the thermocouples and the meter since the voltage junctions of the thermocouples are not insulated from the heaters. The direct current resistance of the chokes should be relatively low compared with that of the meter to promote greater accuracy, and the inductance of the chokes should be as high as possible consistent with the necessarily low resistance value and the physical dimensional limits. A condenser 40 may be connected between the feed line 21 and the junction between the resistor 22 and the heater 14 to compensate for capacitative effects due to distributed capacitance which might exist across the resistor 22.

In order that the deflection of the meter 32 will always be proportional to the power delivered to the load 11, the circuit parameters and the electrical characteristics of the circuit components must be such that the current $I_1$ will be proportional to the load voltage; that the currents $I_2$ and $I_3$ will be proportional to the load current; and the phase difference between the current $I_1$ and the currents $I_2$ and $I_3$ will be substantially the same as the phase angle between the load voltage and the load current.

The circuit components may be selected and their values computed in various ways. For example, the following selection and computations were used in constructing a wattmeter to be used in a range of 300 to 1000 kilocycles with a full-scale indicating meter reading of 15 kilowatts.

A 0–200 microammeter having a resistance of 8 ohms was selected for the indicating meter 32, and since reasonable accuracy and sensitivity were desired the resistance of the radio frequency chokes 33, 34 and 35 was made as small as possible. The two thermocouples should be matched to have response characteristics as nearly the same as possible. The thermocouples selected had a heater resistance of .6 ohms and the heaters were rated at .470 ampere. Having the couples and the meter, the operation characteristics of the combination with the radio frequency chokes 33, 34 and 35 in the circuit can be determined. If the thermocouples follow the normal square law, the deflection D of the meter due to one thermocouple is $$D=KI^2 \text{ or}$$
$$K=\frac{D}{I^2}$$

where I is the absolute value of the current flowing in the heater and K is a constant determined by means of the circuit shown in Fig. 2, where current in steps of different values is passed through heater 14, while no current is passed through heater 15. Fig. 3 illustrates a heater current versus indicator meter current curve constructed from data obtained by use of the circuit in Fig. 2. From this curve it will be seen that in order to obtain a 200 microampere response for the full scale deflection of the indicating meter, heater current of .136 amperes is required. Using the formula $$K=\frac{D}{I^2}$$

we have $$K=\frac{200}{(.136)^2}$$
$$K=\frac{200}{.0185}$$
$$K=10{,}800$$

As before stated, it is intended that the indicating meter 32 shall read full scale, 200 microamperes, when the power into the load is 15 kilowatts at unity power factor. Since the voltage junctions of the thermocouples are connected in series opposition, it will be apparent that in order to get a full scale deflection of the meter one of the voltage junctions must be "dead" and the other must produce the maximum amount of voltage at unity power factor. To obtain this condition the resultant current in one of the thermocouple's heaters must be zero and the resultant current in the other heater must be at a maximum. If we go back to the assumption that currents $I_1$ and $I_2$ are flowing in the same direction in the heater 14 and currents $I_1$ and $I_3$ flow in directions opposite to each other in the heater 15, the resultant current $I_y$ in the heater 15 will be zero only when currents $I_1$ and $I_3$ are equal, and the resultant current $I_x$ in the heater 14 will be at its maximum when the currents $I_1$ and $I_2$ are equal. From the above it will be apparent that at unity power factor currents $I_1$, $I_2$, and $I_3$ must be equal to each other, i. e.

$$I_1=I_2=I_3$$

Using the equation $$D=4KI_1I_z \cos \theta$$

where D is the meter deflection, K is the thermocouple conversion constant, $I_z$ is representative of $I_2$ and $I_3$ and is equal to each, i. e. $I_z=I_2=I_3$, $\angle\theta$ is the phase angle between $I_1$ and $I_z$ and at unity power factor $\angle\theta$ being zero, $$D=4KI_1I_z$$
$$I_1I_z=\frac{D}{4K}$$
$$I_1I_z=\frac{200}{(4)(10{,}800)}=.0046$$
$$I_1=I_z=I_2=I_3=\sqrt{.0046}=.068 \text{ amperes}$$

It will be seen that at unity power factor when currents $I_1$ and $I_2$ are flowing in the same direction in heater 14 the resultant current $I_x$ in that heater will be .136 amperes, and currents $I_1$ and $I_3$ opposing each other and each being equal to .068 amperes, the resultant current $I_y$ in the heater 15 will be zero. This is the condition which provided full scale deflection as found from the curve in Fig. 3 using the circuit in Fig. 2. Therefore, .068 amperes is the design value of each of the currents $I_1$, $I_2$, and $I_3$ when the wattmeter is reading full scale of 200 microamperes corresponding to a power of 15 kilowatts at unity power factor.

In calculating the design value of resistor 22 the current at full load must be considered. For example, for a power of 15 kilowatts to be delivered at 175 amperes a load resistance of 0.5 ohms is indicated. The voltage across the load would then be $175 \times 0.5 = 87.5$ volts. Since the resistance of each of the heaters 14 and 15 is only .6 ohms their resistance can be disregarded in the competation of resistor 22 which is substantially the total resistance parallel with the load 11. Resistance of resistor 22 is then equal to $$\frac{87.5}{.068}=1300 \text{ ohms}$$

With the design values for $I_1$, $I_2$, $I_3$, and resistor 22 calculated, the next consideration is the current transformer 25 which should have the desired current ratio of 175 amperes to .068 amperes and be useable at frequencies of 300 to 1000 kilocycles.

In the preferred embodiment of the invention described herein the transformer 25 is provided with a primary winding 26 consisting of a straight hollow metal tube provided with couplings 40 and 41 at both ends to enable it to be coupled in series with a water cooled load coil, such as a hollow high frequency work coil, and provide a path for cooling water in addition to the electrical path. The primary may be horizontally supported by upright insulators 42 and 43 secured to a flat base 44 made of suitable insulating material. Secondary coils 23 and 24 are disposed on opposite sides of the primary 26 and comprise elongated turns of wire helically wound around rectangular insulator plates 45 and 46 so that opposite long sides or courses of each turn lie across opposite faces of the plates and will be substantially parallel to the primary 26 when the axis of the helical winding is vertical. Apertures 47 and 48 may be provided in corners of the plates 45 and 46 through which the opposite ends of the secondary coils may be passed several times to prevent unraveling of the coils. Flexible leads 50 may be used to connect the coil ends to terminals connectors 51 secured to the base 44. Since the secondary currents $I_2$ and $I_3$ must be equal but flow in opposite directions in each heater, the secondary coils are physically identical except for the fact that they are oppositely polarized.

The plates 45 and 46 are adjustably mounted on upright insulators 52 and 53 secured to the base 44 on opposite sides of and spaced away from the primary 26. A suitable mounting and adjustment is provided by threaded members 60 and 61 secured to the center of the plates 45 and 46 and threaded through upright members 52 and 53. Slots 62 and 63 may be provided in the ends of the members 60 and 61 to receive a screw driver or similar tool to facilitate the adjustment of the secondary coils around and along the axis of the threaded members 60 and 61 in order to change the cooperative position of the secondary coils with respect to the primary 26. It will be apparent that the mutual inductance may be varied by adjusting the position of the secondary coils angularly or laterally with respect to the primary 26. The secondary coils may be fixed after adjustment by lock nuts 64 screwed on members 60 and 61 to bear against the uprights 52 and 53. Since the mutual inductance may be controlled by adjusting the relative position of each secondary coil with respect to the primary the proper ratio of current transformation may be obtained with a relatively small number of turns on the secondary coils.

The completed wattmeter may be calibrated by using standard known loads or by taking power measurements with a suitable standard wattmeter and substituting the wattmeter to be calibrated for the standard wattmeter after each power measurement at a different level and comparing the readings of the two meters. The dial of the meter 32 may be calibrated in terms of watts. Another familiar laboratory method of calibrating a wattmeter is the calorimeter load method which may be used to calibrate this wattmeter.

What is claimed is:

1. An electrical transformer comprising a base, a straight hollow conductor fixed to said base and electrically insulated therefrom for carrying a primary currrent and for carrying a liquid coolant, a secondary coil with a non-magnetic core movably mounted on said base at a side of and spaced from said conductor, said secondary coil comprising elongated turns helically wound around an axis, said axis lying in a plane tangent to a circle drawn around said conductor and coaxial therewith, and means for angularly adjusting said secondary coil with respect to said conductor and said base around an axis at right angles to said plane.

2. An electrical transformer comprising a base, a linearly extending conductor forming a primary mounted on said base and electrically insulated therefrom, a secondary coil having a non-magnetic core movably mounted on said base at one side of and spaced from said primary, the major axis of said secondary coil lying in a plane tangent to a circle drawn around said primary and coaxial therewith, and means for tilting said axis substantially within said plane to adjust said secondary coil angularly with respect to said primary and said base.

3. An electrical transformer comprising a base, a linearly extending primary fixed to said base and electrically insulated therefrom, a secondary coil disposed at one side of and spaced away from said primary, another secondary coil disposed at another side of and spaced from said primary and from said first mentioned secondary coil, said coils being movably mounted on said base and the major axes of said secondary coils lying in planes tangent to circles drawn around said primary and coaxial therewith, and means for tilting said axes within said planes thereby to angularly adjust said secondary coils with respect to said primary and to said base.

4. A high frequency electrical transformer comprising a base, a linearly extending conductor forming a primary secured to said base and electrically insulated therefrom, a substantially rectangular winding having two sides extending substantially parallel to said primary and one of said sides being closer in proximity to said primary than the other thereby inducing a higher voltage in said closer side, said sides lying in separate planes substantially parallel to said primary, a non-magnetic core movably mounted on said base for supporting said secondary winding, and means secured to said core for moving said core while maintaining said sides substantially in their respective planes thereby to angularly adjust said winding with respect to said primary and said base.

5. An electrical transformer comprising an insulating base, a straight primary conductor secured to said base, a helically wound secondary coil, means to support said secondary coil on said base with a major course of said coil extending substantially longitudinally but spaced from and parallel to said primary, and means for adjusting said coil angularly with respect to said primary and said base in such a manner that said major course is rotated substantially within one plane.

6. An electrical transformer comprising a base member of insulating material, spaced parallel supports of insulating material extending from said base at the ends thereof, a tubular primary element supported by said supports and extending across said base in spaced relation thereto, another support member of insulating material extending substantially parallel to said first mentioned support members and mounted on said base at a side thereof, a coil supporting element movably mounted on said other support member, a substantially rectangular coil carried by said coil supporting element with its longest sides extending substantially parallel with the primary element and one of said sides being closer to said primary than the other, and means for rotating said coil around an axis passing through and substantially normal to the long sides of said coil.

RICHARD C. POMEROY.

REFERENCES CITED

The following references are of record in the file of this patent:

UNITED STATES PATENTS

| Number | Name | Date |
| --- | --- | --- |
| 1,581,162 | Boucher | Apr. 20, 1926 |
| 1,794,897 | Hayden | Mar. 3, 1931 |
| 2,027,861 | Fyler | Jan. 14, 1936 |
| 2,140,364 | Lee | Dec. 13, 1938 |
| 2,278,687 | Brown | Apr. 7, 1942 |
| 2,348,325 | Brown | May 9, 1944 |
| 2,375,591 | Schweitzer | May 8, 1945 |